United States Patent
Wu et al.

(10) Patent No.: US 12,165,020 B2
(45) Date of Patent: Dec. 10, 2024

(54) LOAD BALANCING USING DATA-EFFICIENT LEARNING

(71) Applicant: SAMSUNG ELECTRONICS CO., LTD., Suwon-si (KR)

(72) Inventors: Di Wu, Montreal (CA); Jikun Kang, Montreal (CA); Hang Li, Montreal (CA); Xi Chen, Montreal (CA); Yi Tian Xu, Montreal (CA); Dmitriy Rivkin, Montreal (CA); Taeseop Lee, Seoul (KR); Intaik Park, Seoul (KR); Michael Jenkin, Toronto (CA); Xue Liu, Montreal (CA); Gregory Lewis Dudek, Westmount (CA)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1017 days.

(21) Appl. No.: 17/139,561

(22) Filed: Dec. 31, 2020

(65) Prior Publication Data

US 2022/0051135 A1     Feb. 17, 2022

Related U.S. Application Data (60) Provisional application No. 63/065,777, filed on Aug. 14, 2020.

(51) Int. Cl.
| | |
|---|---|
| *G06N 20/00* | (2019.01) |
| *G06F 18/20* | (2023.01) |
| *G06F 18/21* | (2023.01) |
| *G06N 3/044* | (2023.01) |
| *G06N 3/08* | (2023.01) |

(Continued)

(52) U.S. Cl.
CPC ........... *G06N 20/00* (2019.01); *G06F 18/217* (2023.01); *G06F 18/295* (2023.01); *H04W 28/0284* (2013.01); *H04W 28/08* (2013.01); *H04W 28/0925* (2020.05)

(58) Field of Classification Search
CPC .......... G06N 20/00; G06N 7/01; G06N 3/006; G06N 3/08; G06F 18/217; G06F 18/295; H04W 28/0284; H04W 28/0925; H04W 28/08; H04L 47/125
See application file for complete search history.

(56) References Cited

U.S. PATENT DOCUMENTS

| | | | |
|---|---|---|---|
| 10,455,451 B2 | 10/2019 | Van Der Velde et al. | |
| 10,546,066 B2 * | 1/2020 | Li | ............................ G06N 3/08 |
| 11,388,644 B2 * | 7/2022 | Kang | ..................... H04W 36/22 |

(Continued)

*Primary Examiner* — Jordany Nunez
(74) *Attorney, Agent, or Firm* — Sughrue Mion, PLLC (57) ABSTRACT

Rapid and data-efficient training of an artificial intelligence (AI) algorithm are disclosed. Ground truth data are not available and a policy must be learned based on limited interactions with a system. A policy bank is used to explore different policies on a target system with shallow probing. A target policy is chosen by comparing a good policy from the shallow probing with a base target policy which has evolved over other learning experiences. The target policy then interacts with the target system and a replay buffer is built up. The base target policy is then updated using gradients found with respect to the transition experience stored in the replay buffer. The base target policy is quickly learned and is robust for application to new, unseen, systems.

17 Claims, 9 Drawing Sheets

(51) Int. Cl.
H04W 28/02 (2009.01)
H04W 28/08 (2023.01)

(56) References Cited

U.S. PATENT DOCUMENTS

| | | | | |
|---|---|---|---|---|
| 11,751,115 | B2* | 9/2023 | Kang | G06N 3/044 |
| | | | | 370/235 |
| 2007/0022426 | A1* | 1/2007 | Steinder | G06F 9/5088 |
| | | | | 718/104 |
| 2012/0042322 | A1* | 2/2012 | Arvidsson | G06F 9/5088 |
| | | | | 718/105 |
| 2013/0336110 | A1* | 12/2013 | Sridhar | H04L 5/0071 |
| | | | | 370/230 |
| 2013/0343281 | A1* | 12/2013 | Bakker | H04W 72/20 |
| | | | | 370/328 |
| 2014/0156566 | A1* | 6/2014 | Kabiljo | G06N 20/00 |
| | | | | 706/12 |
| 2015/0006442 | A1* | 1/2015 | Ogilvie | G06Q 50/01 |
| | | | | 706/12 |
| 2019/0138895 | A1* | 5/2019 | Jin | G06N 3/08 |
| 2020/0143208 | A1* | 5/2020 | Hernandez Leal | G06N 5/043 |
| 2021/0146531 | A1* | 5/2021 | Tremblay | G06N 20/00 |
| 2021/0168684 | A1* | 6/2021 | Kang | H04W 36/08 |
| 2021/0367690 | A1* | 11/2021 | O'Shea | H04B 17/3912 |
| 2022/0014963 | A1* | 1/2022 | Yeh | G06N 7/01 |
| 2022/0051135 | A1* | 2/2022 | Wu | G06F 18/217 |
| 2022/0150786 | A1* | 5/2022 | Kang | G06N 3/044 |
| 2023/0247509 | A1* | 8/2023 | Kang | G06N 3/044 |
| | | | | 370/235 |

* cited by examiner

Algorithm 1 TRLLB: Transfer Reinforcement Learning based Load Balancing

---

Input: Policy bank $B$ including policies $\pi_1, ..., \pi_S$ learned from $S$ source domains. Parameters for target based policy $\pi_{Tb}$: $\psi, \bar{\psi}, \theta, \phi$. Length for the shallow testing $TN$.

1: for $s = 1, ..., S$ do
2:     for $t = 1, ..., TN$ do
3:         Accumulated reward $J_s = J_s + r(a_t, s_t) | a \sim \pi_s$
4:     end for
5: end for
6: $h^* = \arg\max_{\{J_s\}} \pi_s$
7: Select the control policy:

$$\pi_T = \begin{cases} h^*, & \sum_{t=1}^{TN} r(a_t, s_t)|a \sim h^* > \sum_{t=1}^{TN} r(a_t, s_t)|a \sim \pi_{Tb} \\ \pi_{Tb}, & \text{otherwise.} \end{cases}$$

8: for each time step in communication system do
9:     Choose an action $a \sim \pi_T(\cdot|s, \phi)$
10:    Take action $a$, observe state $s$, and receive a reward $r$.
11:    Update the replay buffer $D$
12:    $D \leftarrow (s, a, r, s') \cup D$
13: end for
14: for gradient step do
15:    Random sample a batch of samples from the replay buffer
16:    Update parameters for soft Q value ($\theta$) and state-value ($\psi$) for $\pi_{Tb}$
17:    Update target state value parameters ($\bar{\psi}$) for $\pi_{Tb}$
18:    Update policy parameters ($\phi$) for $\pi_{Tb}$
19: end for

LOAD BALANCING USING DATA-EFFICIENT LEARNING

CROSS REFERENCE TO RELATED APPLICATION

This application claims benefit of priority of U.S. Provisional Application No. 63/065,777, filed Aug. 14, 2020, the contents of which are hereby incorporated by reference.

FIELD

The present disclosure is related to balancing a load of a cellular communication system.

BACKGROUND

Cellular systems use frequency reuse to support multiple users in the area where users can be served by multiple frequencies. Base stations are located at various geographical positions and possibly with directional antennas. This creates a number of cells and thus the cellular system.

A problem arises if many communication terminals (devices) are associated with a small number of cells, because this creates a sub-optimal interference level compared to the overall system throughput. A device may be for example, a communication terminal or user equipment (UE).

Load balancing may be performed with an artificial intelligence algorithm (AI).

SUMMARY

A problem exists when devices in a cellular system when some devices are heavily distributed across space or a subset of the frequencies (or base stations) while other frequencies (or base stations) are lightly loaded.

The reinforcement learning (RL) algorithms aim to learn a control policy to optimize the distribution of devices to a sub set of base stations via trial and error. A reward may be, for example, a throughput achieved in a cell of the cellular system. Reinforcement learning may need a large amount of training data to learn a reliable control policy.

Thus, a problem exists in training an AI algorithm to recognize how the devices in a cellular system can be re-distributed (in terms of association with base stations) in order to increase overall system throughput.

A solution providing efficient training of an AI algorithm to balance a load of a new or changed cellular system is provided by this application.

Embodiments provide a solution referred to herein as the transfer reinforcement learning load balancing (TRLLB) algorithm.

The TRLLB algorithm reuses the policies learned on source tasks as well as learning a new policy using the most recently gathered learning experiences. This approach combines deep learning, reinforcement learning, and transfer learning.

On some networks devices can either be active on the cellular system (active mode users) or connected but not consuming significant network resources (idle mode users).

Embodiments herein formulate load balancing for idle mode users (i.e., IMLB) as a Markov decision process.

Embodiments herein develop a new transfer reinforcement learning algorithm to tackle such load balancing problems. The proposed approach has a better data efficiency than a naive RL-based approach.

Embodiments have been evaluated against several baselines and show significant improvement relative to the baseline in terms of obtaining high rewards after a limited number of training episodes.

Provided herein is a method for machine learning-based load balancing of a second communication system (for example using deep reinforcement learning).

Also provided herein is a method for learning-based load balancing of a target communication system, the method including: determining a plurality of rewards corresponding to a plurality of policies applied to a first communication system, wherein the first communication system corresponds to a first target domain; selecting a first source policy having a first reward among the plurality of rewards, the first reward being a highest reward among the plurality of rewards; evaluating a second reward of a second policy applied to the first communication system, wherein the second policy is a base target policy; when the first reward is greater than the second reward, determining a selected policy to be the first source policy; when the first reward is not greater than the second reward, determining the selected policy to be the base target policy; building a replay buffer by applying the selected policy to the first communication system; updating a plurality of parameters of the base target policy based on the replay buffer; and balancing the target communication system using the base target policy.

Also provided herein is a server for performing learning-based load balancing of a target communication system, the server including: one or more processors; and a memory, wherein the memory is configured to store instructions for execution by the one or more processors, and the instructions are configured to cause the server to: determine a plurality of rewards corresponding to a plurality of policies applied to a first communication system, wherein the first communication system corresponds to a first target domain; select a first source policy having a first reward among the plurality of rewards, the first reward being a highest reward among the plurality of rewards; evaluate a second reward of a second policy applied to the first communication system, wherein the second policy is a base target policy; when the first reward is greater than the second reward, the instructions are configured to cause the server to determine a selected policy to be the first source policy; when the first reward is not greater than the second reward, the instructions are configured to cause the server to determine the selected policy to be the base target policy; build a replay buffer by applying the selected policy to the first communication system; update a plurality of parameters of the base target policy based on the replay buffer; and balance the target communication system using the base target policy.

Also provided herein is a non-transitory computer readable medium storing instructions, the instructions configured to cause one or more processors to: determine a plurality of rewards corresponding to a plurality of policies applied to a first communication system, wherein the first communication system corresponds to a first target domain; select a first source policy having a first reward among the plurality of rewards, the first reward being a highest reward among the plurality of rewards; evaluate a second reward of a second policy applied to the first communication system, wherein the second policy is a base target policy; when the first reward is greater than the second reward, the instructions are configured to cause the one or more processors to determine a selected policy to be the first source policy; when the first reward is not greater than the second reward, the instructions are configured to cause the one or more processors to determine the selected policy to be the base target policy;

build a replay buffer by applying the selected policy to the first communication system; update a plurality of parameters of the base target policy based on the replay buffer; and balance a target communication system using the base target policy.

BRIEF DESCRIPTION OF THE DRAWINGS

The text and figures are provided solely as examples to aid the reader in understanding the invention. They are not intended and are not to be construed as limiting the scope of this invention in any manner. Although certain embodiments and examples have been provided, it will be apparent to those skilled in the art based on the disclosures herein that changes in the embodiments and examples shown may be made without departing from the scope of embodiments provided herein.

DETAILED DESCRIPTION

A cellular system is, for example, a cellphone network. A cellular system may span a city or a country. A cellular system comprises a core network that connects to base stations with antennas on towers.

Deep reinforcement learning (deep RL) is a subfield of machine learning that combines reinforcement learning and deep learning. Deep RL incorporates deep learning into the solution, allowing agents to make decisions with unstructured input data without manual engineering of state spaces.

In artificial intelligence, an intelligent agent (IA) refers to an autonomous entity which acts, directing its activity towards achieving goals (i.e. it is an agent), upon an environment using observation through sensors and consequent actuators (i.e. it is intelligent).

Training an AI algorithm is generally called learning. The AI algorithm learns.

In some instances, learning makes use of domain adaptation. Domain adaptation is a field associated with machine learning and transfer learning. In domain adaptation, learning occurs from a source data distribution of a well performing model which is then applied to a different (but related) target data distribution.

A Markov decision process is a discrete-time stochastic control process. It provides a mathematical framework for modeling decision making in situations where outcomes are partly random and partly under the control of a decision maker.

Load balancing in a cellular system is the process of distributing network traffic across multiple cells. This ensures no single cell bears too much demand from terminal devices. By spreading the load, user terminals see improved system responsiveness, on the average.

Transfer learning may be performed, for example, from a first cellular system for an actual city to determine an AI algorithm to determine load balancing for a deployment of a new system in the same or a different city.

When discussing parameters of a learning system such as a neural network, the feature weights of the corresponding algorithm may be referred to as simply "parameters of the network."

A description of a solution of the application is now provided.

Figure 1A:
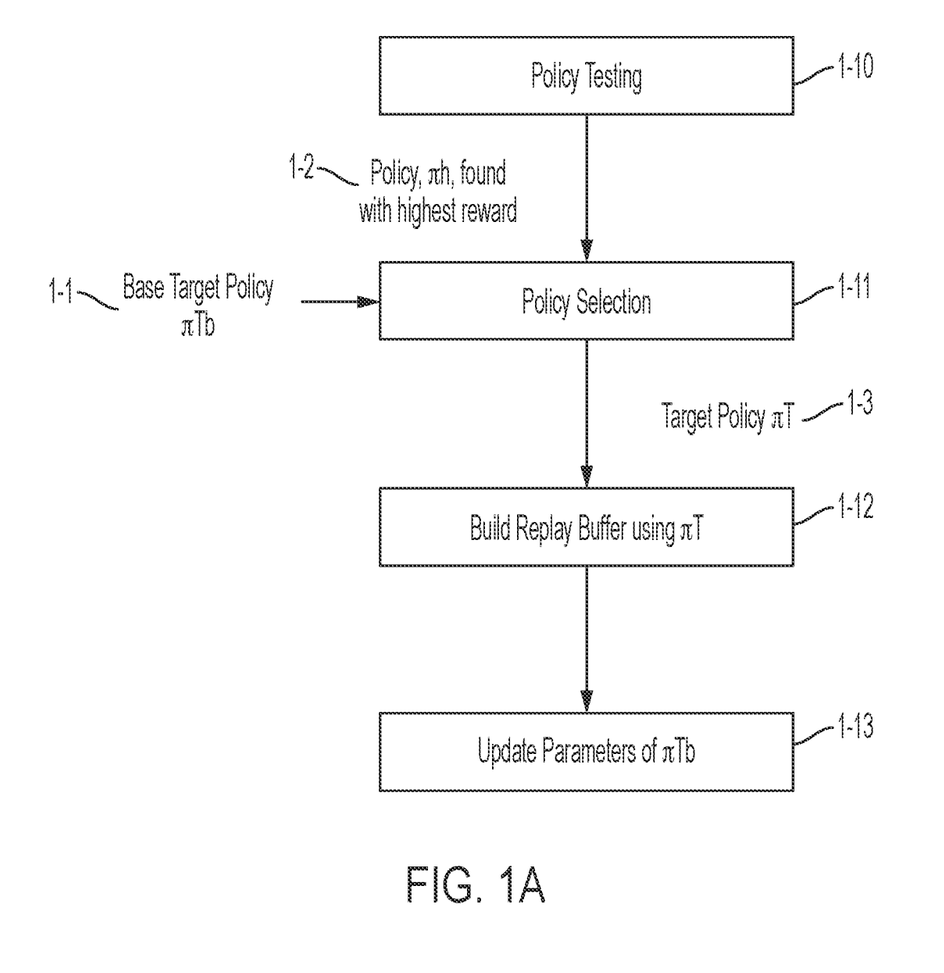
FIG. 1A illustrates a logic flow for determining a base target policy $\pi Tb$ according to some embodiments.

FIG. 1A illustrates a logic flow including performing policy testing (operation 1-10) to identify a policy $\pi h$ (item 1-2) from several source domains with a highest reward. The logic flow also includes comparing (operation 1-11) $\pi th$ (item 1-2) with a base target policy $\pi Tb$ (item 1-1). The base target policy $\pi Tb$ provides good adaptability to different target tasks.

The result of the comparison is to choose either policy $\pi h$ or policy $\pi Tb$. The chosen policy is referred to as $\pi T$ (item 1-3).

Policy $\pi T$ is then used to build a replay buffer (operation 1-12). A replay buffer is a collection of observed rewards when applying the policy $\pi T$ to a communication system.

After building the replay buffer, the parameters of $\pi Tb$ are then updated (operation 1-13).

A cellular system may then be load-balanced using $\pi Tb$.

Figure 1B:
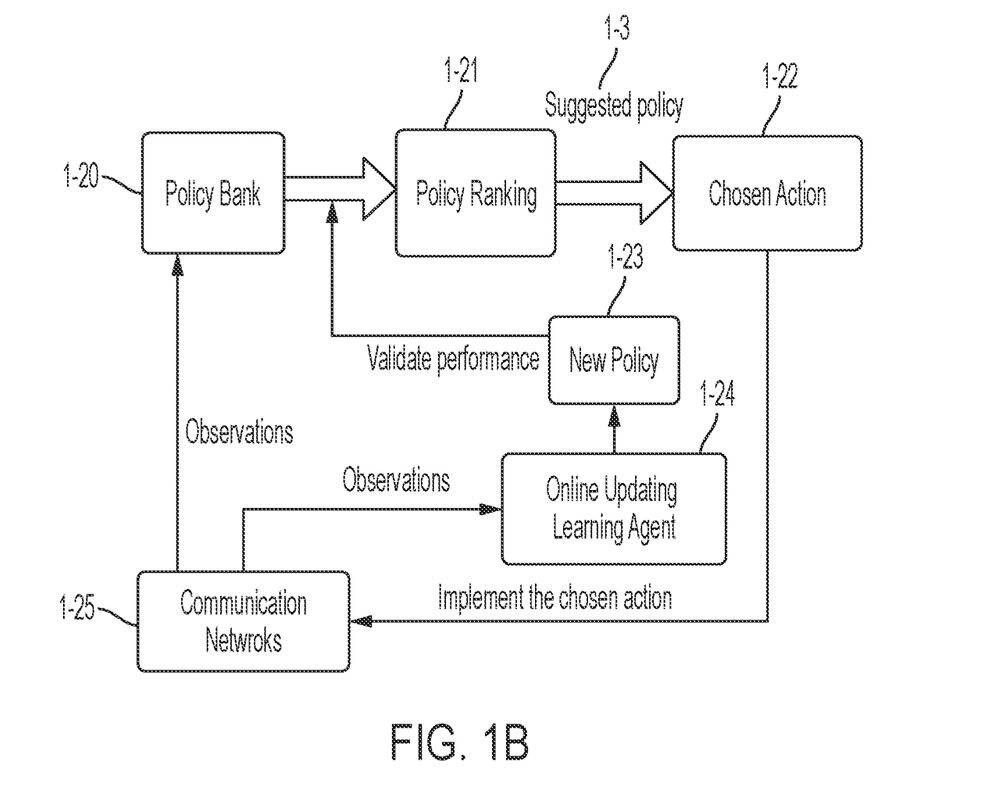
FIG. 1B illustrates a block diagram for collecting observations and updating policies according to some embodiments.

FIG. 1B illustrates a transfer reinforcement learning framework, according to some embodiments. The policy bank, B (item 1-20), stores the policies learned on the source tasks. The source task and target task have the same MDP formulation.

Load balancing is formulated as an MDP and soft actor critic ("SAC", discussed below, particularly FIG. 4B lines 8-19) is applied by some embodiments to perform load balancing.

However, a SAC-based control algorithm without reusing prior knowledge would require a huge amount of training data and take a long time to learn a convergent control policy. This is unacceptable for real-world applications. Instead of learning from scratch, embodiments provided herein utilize a transfer reinforcement learning based load balancing (sometimes referred to herein as TRLLB) framework. The framework is shown in FIG. 1B. The basic idea for transfer reinforcement learning is to reuse the policy learned on the source tasks for the target task. The source tasks are in the same domain (dealing with, for example, idle mode load balancing problems) as the target task. Embodiments provided herein provide interactions with the environments. As shown in FIG. 1B, several policies learned on the source control tasks are stored in the policy bank (item 1-20). Meanwhile, besides the source policies, also learned are the new target base policy $\pi Tb$ (item 1-1) which is trained with interaction experiences on the target domain. Given a new (target task), the source policies and base target policy are evaluated on the target domain for a short period (operation 1-22) and the policy that has the best performance on the target task is used on the target task such as communication networks (item 1-25). A policy, for example πTb (item 1-1), is then updated (operation 1-24) and is useful (indicated by item 1-23) for comparison with policies from the policy bank (item 1-20) for suggesting a policy.

Figure 2:
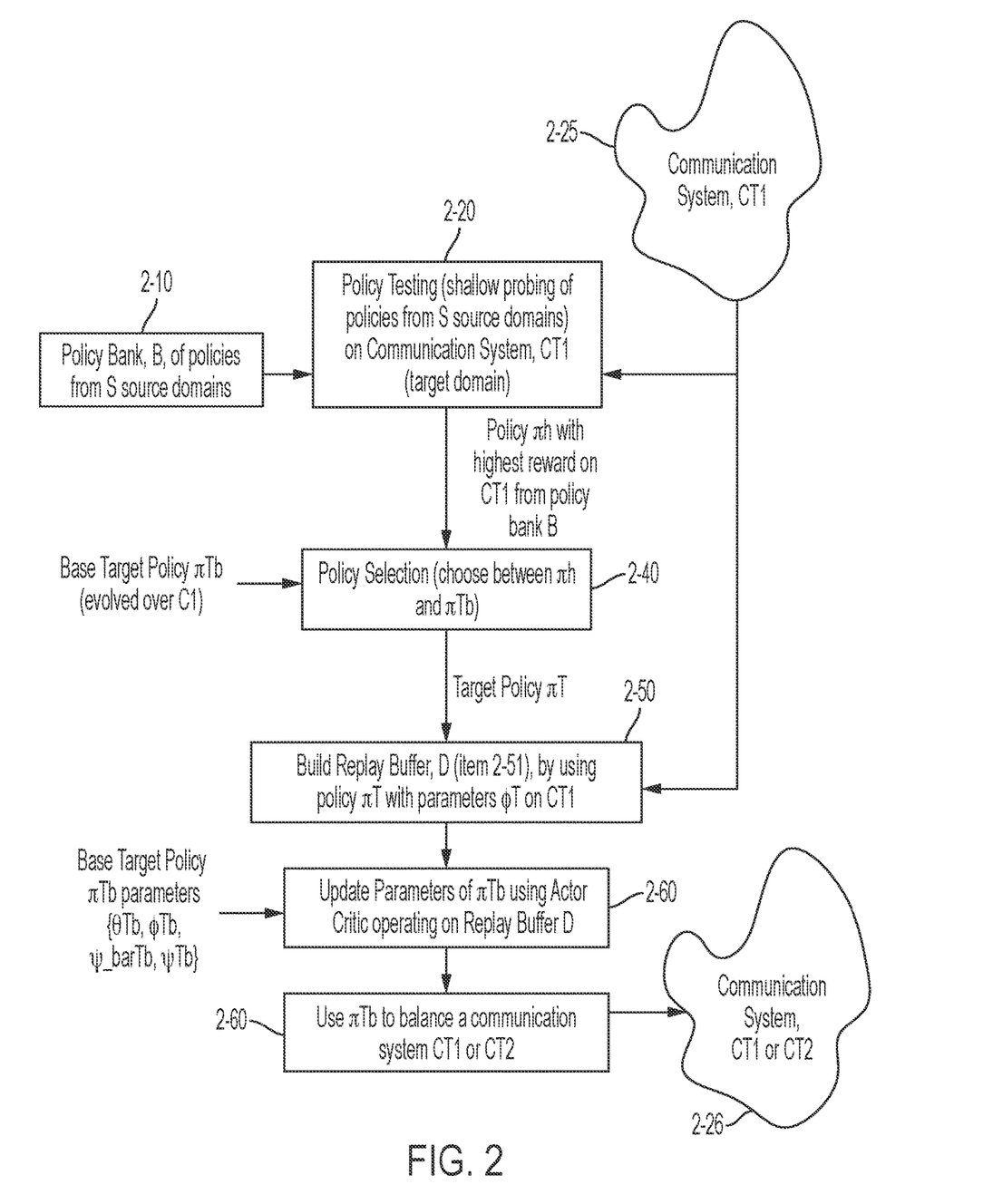
FIG. 2 illustrates a logic flow for determining the base target policy $\pi Tb$ including operations with respect to a communication system CT1 and a communication system CT2 according to some embodiments.

FIG. 2 illustrates an embodiment providing further description of features of the logic flow of FIG. 1A and further details of FIG. 1B.

Policy testing is performed using shallow probing of policies from S source domains on a communication system CT1 which is a target domain. An input to the shallow probing is a policy bank, B (item1-20), of policies from the S source domains (operation 2-10). Based on the policy testing at operation 2-20, a policy πth (item 1-2), from policy bank B (item 1-20), is identified with highest reward on CT1 (item 2-15).

Policy selection then occurs at operation 2-40. The base target policy πTb, evolved over communication system Cl (see input to operation 2-40) is compared with πth and the target policy πT (item 1-3) is identified as either πth (item 1-2) or πTb (item 1-1).

Figure 5A:
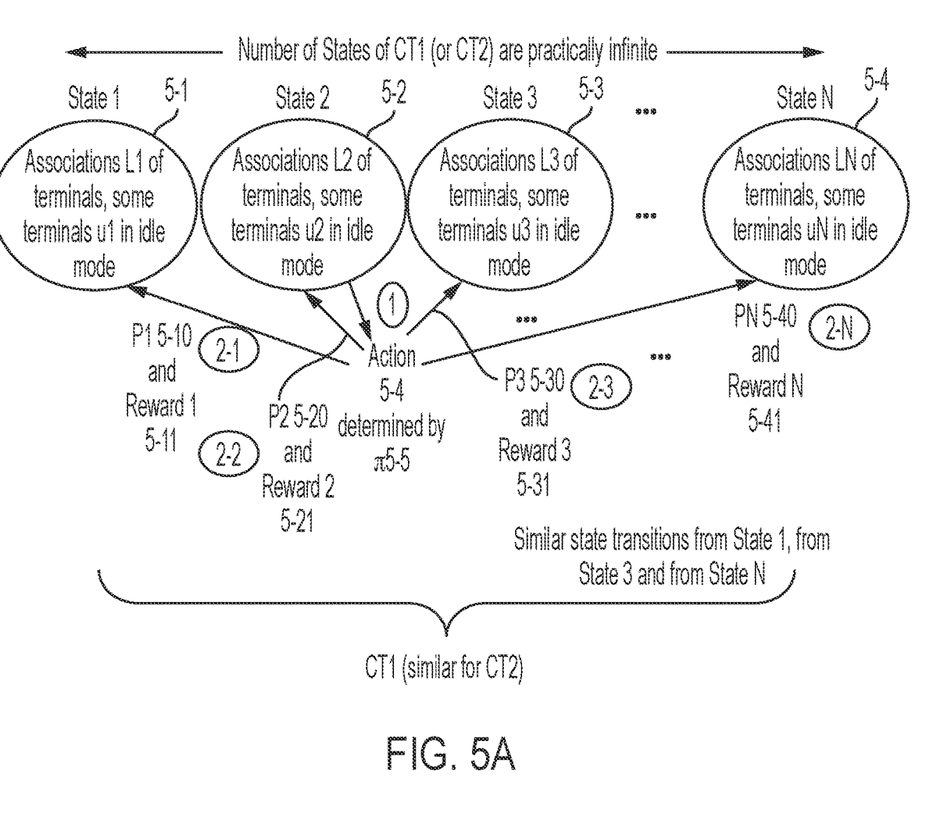
FIG. 5A illustrates a modeling of the communication system CT1 as a Markov decision process (MDP), according to some embodiments.

The replay buffer, D (item 2-51), is then built at operation 2-50 by applying πT (item 1-3) to CT1 (item 2-25). Target policy πT (item 1-3) is characterized by parameters πT (feature weights in the neural network).

Each entry of the replay buffer D (item 2-51) corresponds to an N tuple consisting of {s, a, r, s'} in which s is a current state, a is an action chosen by πT (item 1-3), r is the reward obtained, and s' is then next state arrived at. A Markov decision process is illustrated in FIG. 5A.

Parameters of the base target policy πTb (item 1-1) are then updated at operation 2-60 using an actor critic paradigm or algorithm operating on the replay buffer D. In embodiments provided herein, the parameters associated with πTb (item 1-1) are not only the feature weights φ. In some embodiments, the parameters to be updated are based on the actor-critic paradigm or algorithm and include parameters θTb of a value network, φTb of the πTb policy network, ψTb weights of a state value network (see input to operation 2-60). In some cases, regularizing terms are computed and are referred to as ψ_barTb. See, for example, T. Haarnoja, A. Zhou, P. Abbeel, and S. Levine, "Soft actor-critic: Off policy maximum entropy deep reinforcement learning with a stochastic actor," arXiv preprint arXiv:1801.01290, 2018 (hereinafter "Haarnoja Reference").

The updated policy πTb (item 1-1) may then be used at operation 2-60 to balance CT1 or another communication system (indicated generally as 2-26).

Figure 3:
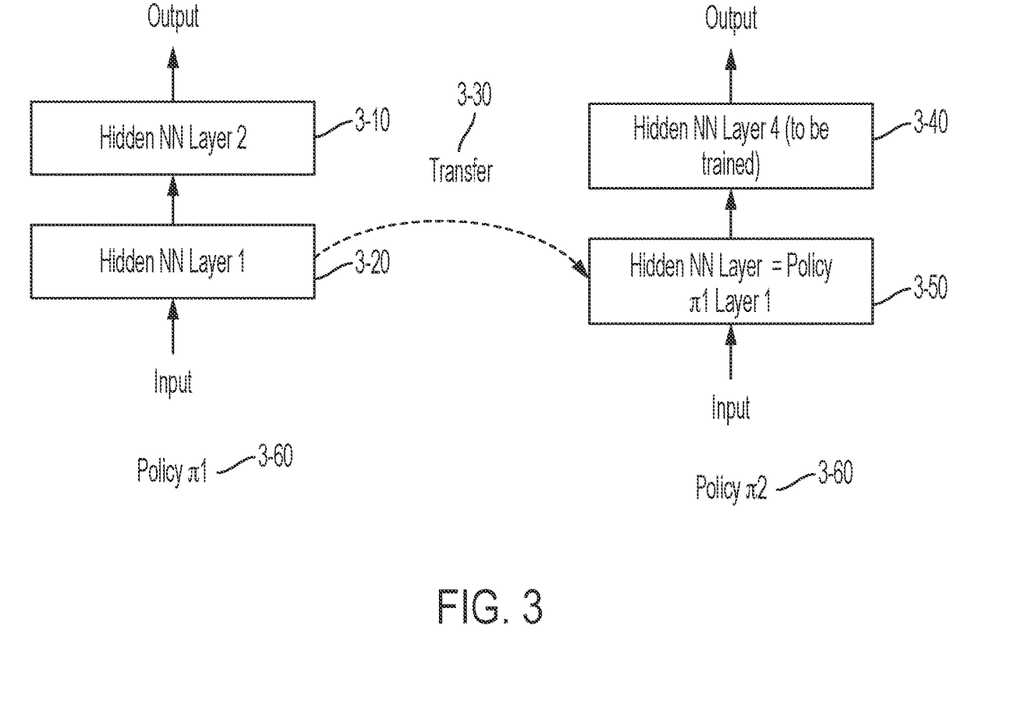
FIG. 3 schematically illustrates transfer learning whereby a policy $\pi 2$ uses the weights for the neural networks adopted from a policy $\pi 1$, according to some embodiments.

FIG. 3 illustrates an example of transfer learning with a policy π1 (item 3-60) with a first input which has already been trained and a policy π2 (item 3-70) with a second input. Only a few example layers 3-10, 3-20 and separately 3-40 and 3-50 are shown for illustration purposes. Not all the feature weights of π2 are known at the beginning. Policy π2 needs to be trained and operates on a different but similar data structure. In FIG. 3, the input on the left and the input on the right are not identical but share structure or statistics. The dashed arrow 3-30 indicates that feature weights of a hidden layer in π1, called layer 1 3-20 in FIG. 3, may be assigned as the feature weights of a hidden layer in π2, illustrated in FIG. 3 as the lowest layer 3-50 in π2. A different layer of π2, called layer 4 3-40 in FIG. 3 and which is an upper layer, may then be trained based on the input to π2. The weights of π1 at an example upper layer called layer 2 in FIG. 3 are not used in the transfer learning.

The training in FIG. 2 is substantially different than the transfer learning in FIG. 3.

Figure 4A:
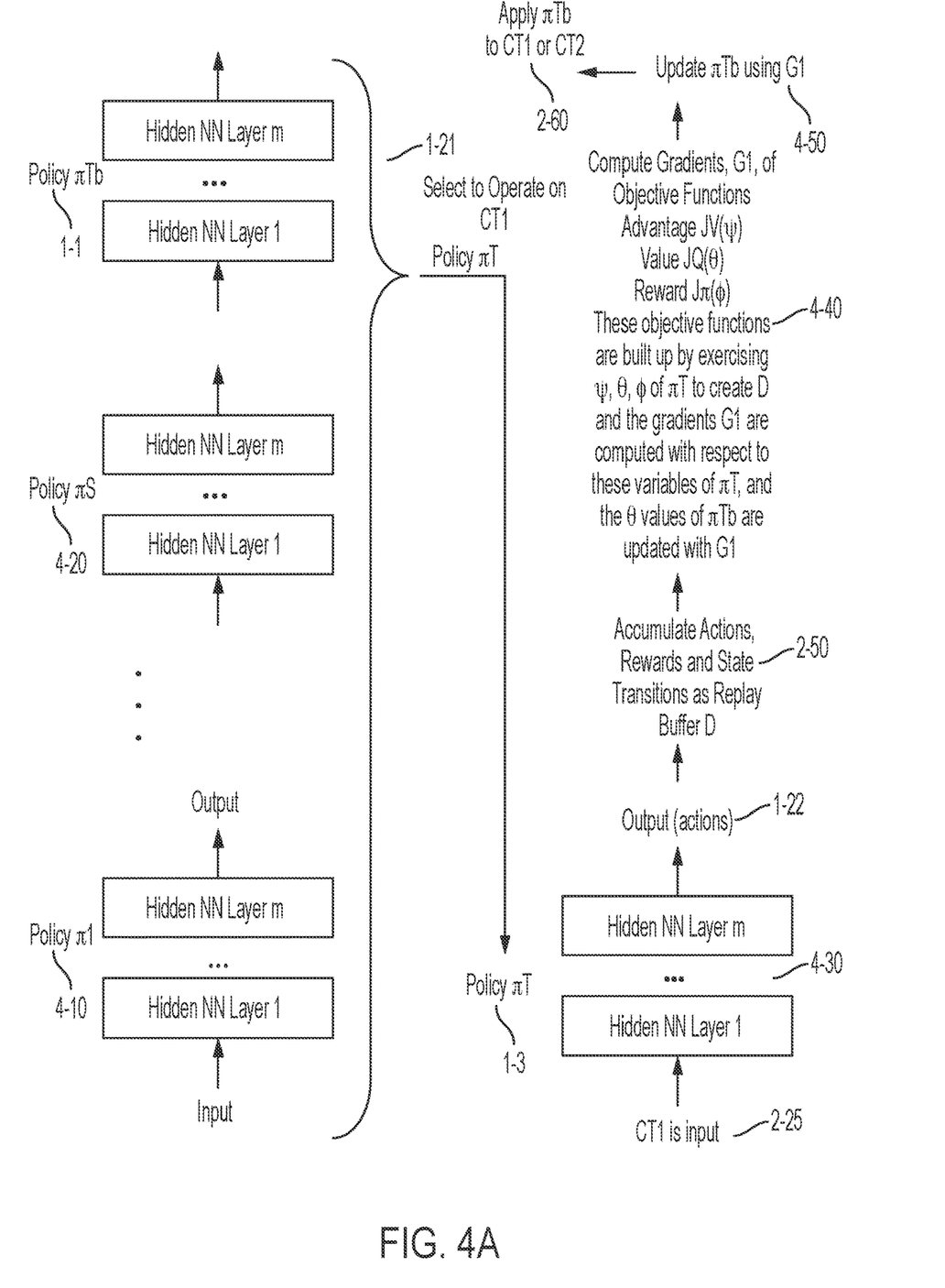
FIG. 4A illustrates events of the logic flow of FIG. 2 with further description particularly related to how a replay buffer D, possibly related to a different policy, is used to determine gradients used for updating parameters of $\pi Tb$, according to some embodiments.
Figure 4B:
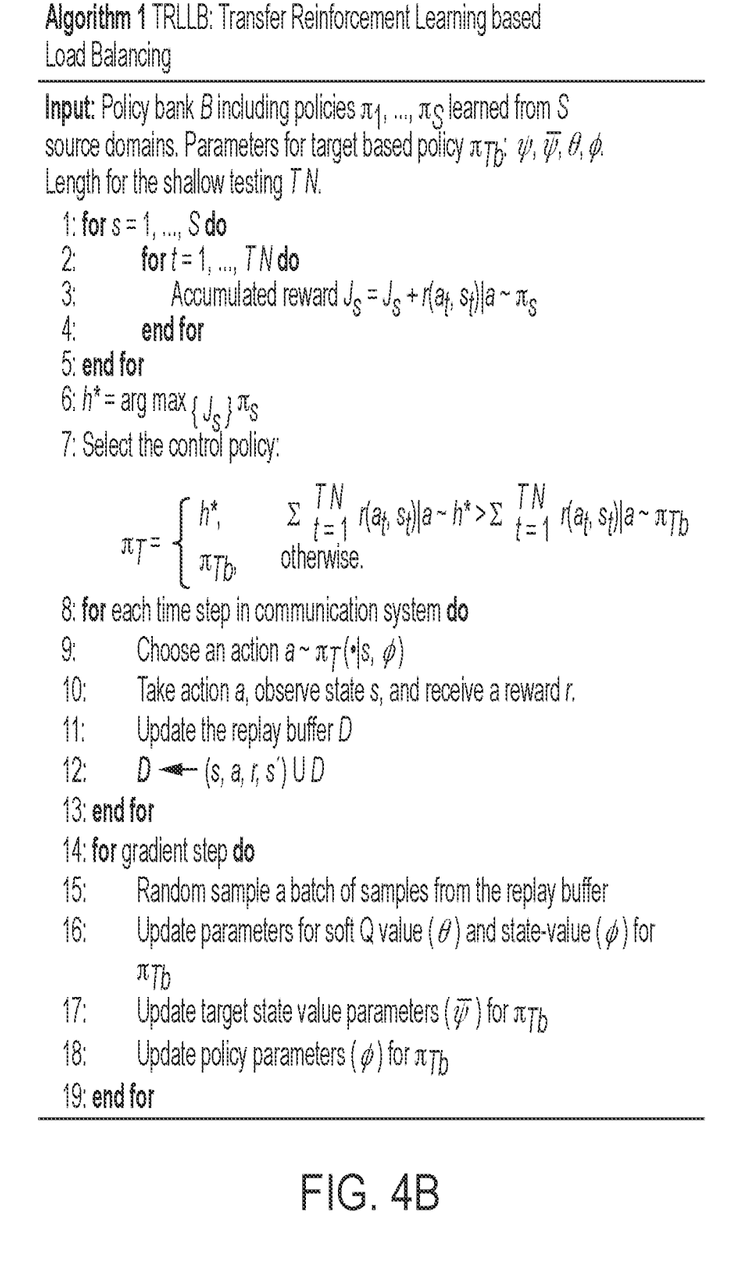
FIG. 4B illustrates events of the logic flow of FIG. 2 expressed as pseudocode, according to some embodiments.

FIG. 2 includes a policy bank. The base target policy πTb continues to involve based on the policy bank and target systems that either πh or πTb are applied to. As illustrated in FIGS. 4A and 4B, gradients developed using the replay buffer D (item 2-51) are developed for πTb and then applied to update parameters associated with the actor critic algorithm used to update πTb.

FIG. 4A illustrates, on the left, a collection of policies π1 (item 4-10) to πS (item 4-20) from the policy bank, B (item 1-20). Each policy is visualized as corresponding to a neural network with hidden layers. Also shown on the left is the base target policy πTb (item 1-1). One of these policies on the left is selected to be the target policy πT (item 1-3) which will operate on the communication system CT1.

The selected policy, in the role of πT (item 1-3), is then applied as neural network (item 4-30) to CT1 (item 2-25) as shown in the lower right of FIG. 4A. Each time the policy πT 1-3 chooses an action, a reward results and a state transition from a state s to a state s' occurs. These values form an N-tuple. The N-tuples are collected in the replay buffer D 2-51 (operation 2-50). The replay buffer D (item 2-51) is built using the policy πT (item 1-3).

After building up the replay buffer, D (item 2-51) is sampled and gradients G1 are computed with respect to objective functions (operation 4-40). The object is to update the base target policy πTb using G1 (operation 4-50). Thus, FIG. 4A illustrates obtaining a random sample batch from the replay buffer; updating θ parameters of a Q network for a soft Q value; updating ψ parameters of a model network for the base target policy; updating ψ_bar parameters of a target value network for the base target policy; and updating φ model parameters for the base target policy.

For example, the gradients may correspond to an actor critic training or learning paradigm. The actor critic training or learning paradigm may use a stochastic aspect and so be a soft actor critic. See, for example, the Haarnoja Reference.

In some embodiments, the objective functions correspond to an Advantage metric (JV(ψ)), a Value metric (JQ(θ)), and a Reward metric (Jπ(φ)). See, for example, the Haarnoja Reference.

Following the Haarnoja Reference, the Reward metric may be defined as $$J(\pi) = \Sigma_{t=0}^{T} E[r + \alpha H(\pi)] \quad \text{Eq. 1}$$

In Eq. 1, the summation is over a time index, t. In general, the state s, the action a and the reward r are a function of t. E is an expectation operator, H is an entropy term and α is a temperature parameter. Please see the Haarnoja Reference for more details.

The Advantage metric may be defined as $$J_V(\psi) = E[0.5(V_\psi - E[(Q_\theta - \log \pi)])^2] \quad \text{Eq. 2}$$

In Eq. 2, the first expectation is over a state from the replay buffer, the second expectation is over an action taken, V( ) is a function of state, $Q_\theta$ is a function of state and action and the argument of the log( ) is a function of the action conditioned on the state. As in Eq. 1, state s and action a are a function of time. Please see the Haarnoja Reference for more details.

The Value metric may be defined as $$J_Q(\theta) = E[0.5(Q_\theta - \widehat{Q_\theta})^2] \quad \text{Eq. 3}$$

In Eq. 3, the expectation is over a state and action pair from the replay buffer, the $Q_\theta$ and $\widehat{Q_\theta}$ (see Eq. 4) are a function of state and action. As in Eq. 1, state s and action a are a function of time. Please see the Haarnoja Reference for more details.

$$\widehat{Q_\theta} = r + \gamma E[V_{\bar{\psi}}]$$ Eq. 4

In Eq. 4, the expectation is over a next state, the argument of $V_{\bar{\psi}}$ is a next state, and r is a reward associated with a current state and action pair. As in Eq. 1, state s and action a are a function of time. Please see the Haarnoja Reference for more details.

$V_{\bar{\psi}}$ (also referred to as Vψ_bar herein) is a moving average of Vψ in the last few time steps.

Q can be learned by minimizing the soft Bellman error using Eq's. 3 and 4.

πTb is defined by a set of parameters.

After updating πTb, πTb may be applied to balance the system CT1 or possibly to balance a new system CT2 (operation 2-60).

FIG. 4B illustrates pseudocode corresponding to the logic flows of FIGS. 2 and 4A.

At the beginning of the learning of FIG. 4B, there are S source policies learned from S source tasks stored in the policy bank B. These source tasks are drawn from the same domain and have the same state and action space as the target task. For these source policies, in some embodiments, soft actor critic is used as the base RL learner. During the learning process, these source task policies remain unchanged to control the computation overhead.

Given a new task, load balancing of CT1 for example, the source solutions are applied on the target task for a short period TN (lines 1-6 in FIG. 4B). This is called shallow trial or probing. TN is usually defined as a small number, e.g., 100.

The best source policy πh is chosen and compared with target base policy πTb (line 7). The policy πTb improves the flexibility of the algorithm.

The policy that can give the highest performance in this period (accumulated reward) is chosen as the target policy πT to interact with the system CT1 (line 8-13). Lines 8-13 represent a data collection phase.

The model parameters for πTb including ψ, Ψ (also referred to as ψ_bar), θ and ϕ are updated with the interaction experiences gathered on the target domain. Lines 14-19 of FIG. 4B represent an update phase.

The data collection phase (lines 8-13) and the update phase (lines 14-19) taken together are sometimes referred to as soft actor-critic "SAC."

The resulting policy πTb of embodiments provided herein provides good adaptability to different target tasks.

Thus, FIGS. 4A and 4B illustrate learning-based load balancing of a target communication system, by, for example, determining a plurality of rewards corresponding to a plurality of policies applied to a first communication system, wherein the first communication system corresponds to a first target domain; selecting a first source policy having a first reward among the plurality of rewards, the first reward being a highest reward among the plurality of rewards; evaluating a second reward of a second policy applied to the first communication system, wherein the second policy is a base target policy; when the first reward is greater than the second reward, determining a selected policy to be the first source policy; when the first reward is not greater than the second reward, determining the selected policy to be the base target policy; building a replay buffer by applying the selected policy to the first communication system; updating a plurality of parameters of the base target policy based on the replay buffer; and balancing the target communication system using the base target policy.

In some embodiments, each policy of the policy bank is associated with a different source domain. Also, in some embodiments, each policy of the policy bank is associated with a corresponding source domain of a plurality of source domains, and each source domain includes a task of idle mode load balancing (IMLB).

In some embodiments of the logic flows of FIGS. 4A and 4B, the rewards include a first reward associated with a first source domain, a second reward associated with a second source domain. In some embodiments, determining a reward may include accumulating the first reward as a first series of summands over a shallow testing length, wherein each summand of the first series is based on applying the first source policy to take a first action in transition from a first state of a Markov Decision Process (MDP); and accumulating the second reward as a second series of summands over the shallow testing length, wherein each summand of the second series is based on applying a second source policy to take a second action in transition from a second state of the MDP.

In some embodiments of the logic flows of FIGS. 4A and 4B, the replay buffer is built by, for the first communication system in a first state of an MDP, choosing an action by applying the selected policy to the first state, wherein the action corresponds to an adjustment of a reselection parameter for a cell in the first communication system. Also the building the replay buffer further may include determining a reward corresponding to the adjustment of the reselection parameter.

In some embodiments of the logic flows of FIGS. 4A and 4B, the replay buffer is built by, updating the replay buffer to include an N-tuple, the N-tuple is (s,a,r,s'), s is the first state, a is the action, r is the reward corresponding to the adjustment and s' is a second state of the MDP.

In some embodiments, applying the base target policy to a second communication system includes, for the second communication system in a first state of an MDP, choosing an action by applying the base target policy to the first state, wherein the action corresponds to an adjustment of a reselection parameter for a cell in the second communication system, wherein the base target policy includes the updated ψ parameters, the updated ψ_bar parameters and the updated ϕ model parameters.

In some embodiments, applying the base target policy to a second communication system is performed in which a second number of cells in the second communication system is higher than a first number of cells in the first communication system, leading to higher interference levels in the second communication system than in the first communication system.

In some embodiments, the first source domain is LTE (can also be a 5G communication system), and the second communication system includes a 5G communication system (can also be a LTE communication system). In some embodiments, the first source domain is LTE, and the second communication system includes an LTE communication system. In some embodiments, the first source domain is 5G, and the second communication system includes a 5G communication system.

In some embodiments, the communication system is a cellular radio network, the first policy dictates an action to be taken for the cellular radio network in the first state, and the first state corresponds to an N-tuple of observations.

FIG. 5A is an example of a Markov decision process in terms of a cellular system such as CT1 (or CT2, the model is general).

The MDP in FIG. 5A is shown as having N states: State 1 (item 5-1), State 2 (item 5-2), State 3 (item 5-3), some existing but not shown states, and State N (item 5-4). The number of states is almost arbitrarily large due to some state labels being real numbers.

As an illustration, at the item marked 1 with a circle around the 1, an action (item 5-4) is chosen. The probabilities of the next state are listed as P1 item 5-10 to advance to State 1 (transition 2-1), P2 (item 5-20) to return to State 2 (transition 2-2), P3 (item 5-30) to advance to State 3 (transition 2-3) and PN (item 5-40) to advance to State N (transition 2-N). The rewards associated with these example transitions are illustrated as 5-11, 5-21, 5-31, and 5-41.

In some embodiments, the MDP is described as follows.

State: the state includes three types of system observations for some or all cells of the system. The observations include the active number of terminals for the $i^{th}$ cell ($UE_i$). The second observation is the cell physical resource block (PRB) ratio, $\rho_i$. This may be defined as the ratio of used PRBs in the $i^{th}$ cell to the total number of PRBs available in the $i^{th}$ cell. This ratio is defined on the closed interval [0,1]. The third observation is the average data throughput per UE in the $i^{th}$ cell, $I_i$.

The state of the MDP for an M cell system is then $$\text{State} = \{\rho_1, \rho_1, \ldots, \rho_M, UE_1, \ldots, UE_M, I_1, \ldots, I_M\} \quad \text{Eq. 5}$$

The output for the RL method are control actions for the communication system control variables, i.e., cell re-selection parameter for each cell which is a continuous value and lies in the range [0, 1]. After taking action A at time t, the environment returns an immediate reward R to the agent, which is defined as the minimum average IP throughput per UE per cell, which is a scalar. By optimizing (maximizing) the minimum average IP throughput per UE per cell, the load will be distributed more evenly, and the system efficiency improved.

A portion of the solution provided herein uses SAC, see the Haarnoja Reference. SAC is a model-free off-policy DRL algorithm. SAC is based on off-policy maximum entropy updates and the actor-critic learning framework. It is more data-efficient and robust compared with other prior on-policy and off-policy RL methods. Since it is an off-policy method, SAC alternates between the data collection phase and parameter updating phases with an experience replay mechanism. With experience replay, the interaction experiences during the learning process could be saved and reused to further improve the data efficiency and stabilize the learning process. Off-policy updating enables SAC to reuse the previous learning experiences stored in the replay buffer, and the maximum entropy formulation helps enhance the algorithm's exploration and robustness. The structure for SAC is represented by lines 8-19 of FIG. 4B. The main components for SAC including: policy network represented by model parameters $\phi$; Q-network with model parameters $\theta$; a value network with model parameters $\psi$. The policy network takes in the state observations and outputs the mean and standard deviation of an action distribution. The Q network estimates the value of state-action pairs. The value network estimates the value of a state.

To learn a SAC based load balancing control policy is to learn a set of models for the aforementioned networks. The RL agent interacts with the communication system by taking control actions on the cell re-selection parameters. The agent receives an immediate reward, and the communication system evolves into the next state. The interaction experiences are saved in a replay buffer. The value network and Q network will first be updated based on the a batch of sampled experiences, and the policy network will then be updated. The Q network is updated based on the soft Bellman residual shown in Equations 3 and 4 where D is the replay buffer. (st, at) is the state and action pair at time step t.

Figure 5B:
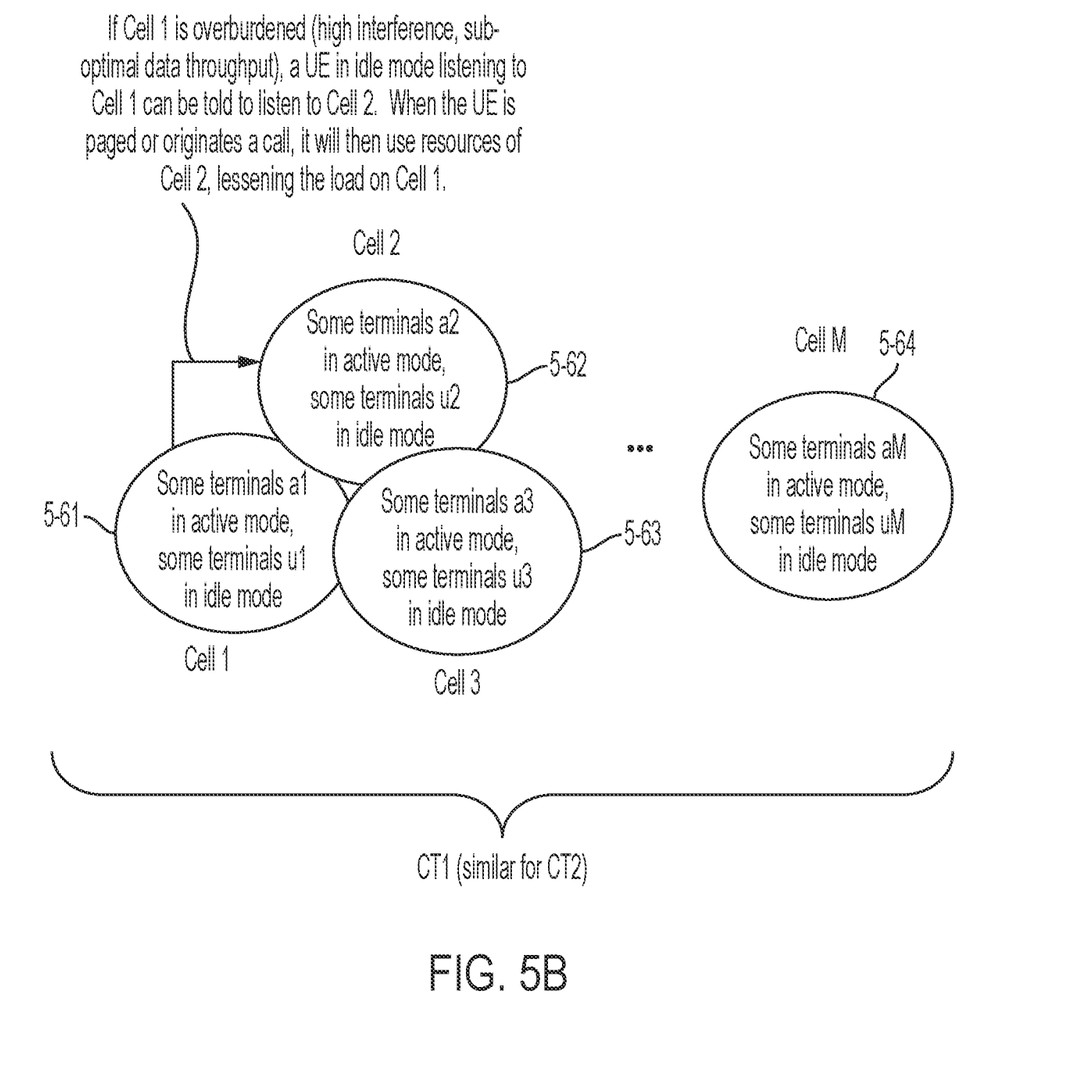
FIG. 5B is a schematic representation of the communication system CT1 in a geographic sense with illustration of some cells.

FIG. 5B is a schematic representation of a communication system including cells distributed over a geographic area. Cell 1 (item 5-61) includes a1 terminals in active mode and u1 terminals in idle mode. A terminal, for example UEx, may be associated with Cell 1. If Cell 1 is heavily loaded, when UEx receives an incoming call, or originates an out-going call by accessing Cell 1 for resources, the condition of Cell 1 will be a yet greater increase in load. Load balancing includes, for example, directing UEx to associate with Cell 2 (item 5-62) instead, which has unused capacity available. A cell 3 (item 5-63) and cell M (item 5-64) are also indicated (generally there many additional cells, only indicated in FIG. 5B by an ellipsis ( ... )).

Figure 6:
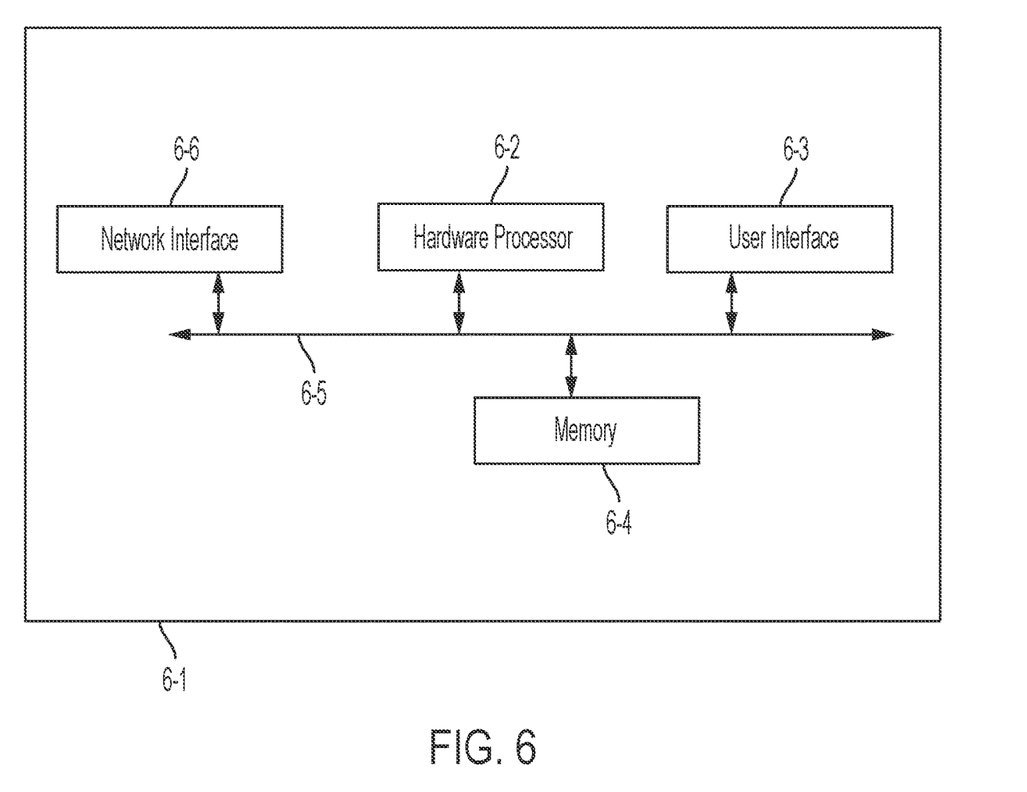
FIG. 6 illustrates an apparatus, according to some embodiments.

FIG. 6 illustrates an exemplary apparatus 6-1 for implementation of the embodiments disclosed herein. The apparatus 6-1 may be a server, a computer, a laptop computer, a handheld device, or a tablet computer device, for example. Apparatus 6-1 may include a hardware processor 6-2. The hardware processor may be an ASIC (application specific integrated circuit), CPU (for example CISC or RISC device), or custom hardware. Apparatus 6-1 also may include a user interface 6-3 (for example a display screen and/or keyboard and/or pointing device such as a mouse). Apparatus 6-1 may include a memory 6-4. The memory 6-4 may be a non-transitory computer readable medium storing instructions for execution by the hardware processor 6-2 to cause apparatus 6-1 to perform any of the methods of embodiments disclosed herein.

Embodiments were evaluated with various load balancing algorithms for systems with various numbers of cells. The specific comparisons were with a deep deterministic policy gradient method (DDPG), soft actor-critic (SAC), a version of FIG. 4B without the online updating of lines 8-19 (policy bank alone). These are combined with the full algorithm of FIG. 4B, which includes updating $\pi TB$ with experiences from an agent following $\pi T$. Limitations were placed on the interactions with target task environments. Specifically, all of the control policies are only allowed to interact with the target domain environment for a fixed number of episodes. Monte Carlo simulation was used (each Monte Carlo run corresponds to an initial random seed). From this evaluation, it was demonstrated that the $\pi Tb$ of FIG. 4B outperforms DDPG, SAC and the policy bank alone.

It is desirable to be able to train a RL model on one scenario and later use it directly on a different scenario. Evaluations found that TRLLB (FIG. 4A) has better transferability than the SAC algorithm and has competitive performance compared to DDPG. TRLLB outperforms the SAC method achieving improvements for minimum data throughput, standard deviation of data throughput and low data throughput cell ratio respectively on average over the different random seeds. TRLLB (FIG. 4A) demonstrates adaptability to the unseen domain.

Training speed was evaluated when there is no limit on training episode exposure to a target system. Results were averaged over random multiple trials with randomized starting conditions (leading to different UE distributions). It can be observed that: first, TRLLB achieves the best performance after convergence; second, TRLLB has a better training efficiency than the other two algorithms. The learning process of SAC and TRLLB-non are less stable than the learning process of TRLLB.

The reasons for the excellent performance of TRLLB are as follows. Compared with SAC, TRLLB reuses the knowledge stored in the policy library. Since these policies are learned in the same domain. It is possible that such policies have already captured the high-level concepts for the load balancing task. Also, the new policy learned can further adapt to the target domain. Since we learn the new policy using an off-policy manner, the trajectories saved in the experience replay can further facilitate the training efficiency.

What is claimed is:

1. A method for learning-based load balancing of a target communication system, the method comprising:
   determining a plurality of rewards corresponding to a plurality of policies applied to a first communication system, wherein the first communication system corresponds to a first target domain;
   selecting a first source policy having a first reward among the plurality of rewards, the first reward being a highest reward among the plurality of rewards;
   evaluating a second reward of a second policy applied to the first communication system, wherein the second policy is a base target policy;
   when the first reward is greater than the second reward, determining a selected policy to be the first source policy;
   when the first reward is not greater than the second reward, determining the selected policy to be the base target policy;
   building a replay buffer by applying the selected policy to the first communication system;
   updating a plurality of parameters of the base target policy based on the replay buffer; and
   balancing the target communication system using the base target policy; wherein the first communication system is a cellular radio network, the first source policy dictates an action to be taken for the cellular radio network in a first state of a Markov decision process (MDP), and the first state corresponds to an N-tuple of observations; and
   wherein the N-tuple of observations includes a plurality of cell physical resource block (PRB) ratio, $\rho_i$, a plurality of active number of terminals for an $i^{th}$ cell (UE), and a plurality of average data throughput per UE in the $i^{th}$ cell, $I_i$.

2. The method of claim 1, wherein each policy of the plurality of policies is associated with a different source domain.

3. The method of claim 1, wherein each policy of the plurality of policies is associated with a corresponding source domain of a plurality of source domains, and each source domain includes a task of idle mode load balancing (IMLB).

4. The method of claim 1, wherein the first reward is associated with a first source domain, the second reward is associated with a second source domain, and the determining the plurality of rewards comprises:
   accumulating the first reward as a first series of summands over a shallow testing length, wherein each summand of the first series is based on applying the first source policy to take a first action in transition from the first state of the MDP; and
   accumulating the second reward as a second series of summands over the shallow testing length, wherein each summand of the second series is based on applying a second source policy to take a second action in transition from a second state of the MDP.

5. The method of claim 1, wherein the updating comprises:
   obtaining a random sample batch from the replay buffer;
   updating θ parameters of a Q network for a soft Q value;
   updating ψ parameters of a model network for the base target policy;
   updating ψ_bar parameters of a target value network for the base target policy; and
   updating φ model parameters for the base target policy.

6. The method of claim 1, wherein the building the replay buffer comprises, for the first communication system in the first state of the MDP, choosing the action by applying the selected policy to the first state, wherein the action corresponds to an adjustment of a reselection parameter for a cell in the first communication system.

7. A server for performing learning-based load balancing of a target communication system, the server comprising:
   one or more processors; and
   a memory,
   wherein the memory is configured to store instructions for execution by the one or more processors, and the instructions are configured to cause the server to:
   determine a plurality of rewards corresponding to a plurality of policies applied to a first communication system, wherein the first communication system corresponds to a first target domain;
   select a first source policy having a first reward among the plurality of rewards, the first reward being a highest reward among the plurality of rewards;
   evaluate a second reward of a second policy applied to the first communication system, wherein the second policy is a base target policy;
   when the first reward is greater than the second reward, the instructions are configured to determine a selected policy to be the first source policy;
   when the first reward is not greater than the second reward, the instructions are configured to determine the selected policy to be the base target policy;
   build a replay buffer by applying the selected policy to the first communication system;
   update a plurality of parameters of the base target policy based on the replay buffer;
   balance the target communication system using the base target policy;
   wherein the first communication system is a cellular radio network, the first source policy dictates an action to be taken for the cellular radio network in a first state of a Markov decision process (MDP), and the first state corresponds to an N-tuple of observations; and
   wherein the N-tuple of observations includes a plurality of cell physical resource block (PRB) ratio, $\rho_i$, a plurality of active number of terminals for an $i^{th}$ cell (UE;), and a plurality of average data throughput per UE in the $i^{th}$ cell, $I_i$.

8. The server of claim 7, wherein each policy of the plurality of policies is associated with a different source domain.

9. The server of claim 7, wherein each policy of the plurality of policies is associated with a corresponding source domain of a plurality of source domains, and each source domain includes a task of idle mode load balancing (IMLB).

10. The server of claim 7, wherein the first reward is associated with a first source domain, the second reward is associated with a second source domain, and the instructions are further configured to cause the server to determine the plurality of rewards by:

accumulating the first reward as a first series of summands over a shallow testing length, wherein each summand of the first series is based on applying the first source policy to take a first action in transition from the first state of the MDP; and     accumulating the second reward as a second series of summands over the shallow testing length, wherein each summand of the second series is based on applying a second source policy to take a second action in transition from a second state of the MDP.

11. The server of claim 7, wherein the instructions are further configured to cause the server to build the replay buffer for the first communication system in a the first state of the MDP by choosing the action by applying the selected policy to the first state, wherein the action corresponds to an adjustment of a reselection parameter for a cell in the first communication system.

12. The server of claim 7, wherein the instructions are further configured to cause the server to update the plurality of parameters by:

obtaining a random sample batch from the replay buffer;
    updating $\theta$ parameters of a Q network for a soft Q value;
    updating $\psi$ parameters of a model network for the base target policy;
    updating $\psi\_bar$ parameters of a target value network for the base target policy; and
    updating $\phi$ model parameters for the base target policy.

13. A non-transitory computer readable medium storing instructions, the instructions configured to cause one or more processors to:

determine a plurality of rewards corresponding to a plurality of policies applied to a first communication system, wherein the first communication system corresponds to a first target domain;

select a first source policy having a first reward among the plurality of rewards, the first reward being a highest reward among the plurality of rewards;

evaluate a second reward of a second policy applied to the first communication system, wherein the second policy is a base target policy;

when the first reward is greater than the second reward, the instructions are configured to determine a selected policy to be the first source policy;

when the first reward is not greater than the second reward, the instructions are configured to determine the selected policy to be the base target policy;

build a replay buffer by applying the selected policy to the first communication system;

update a plurality of parameters of the base target policy based on the replay buffer;

balance a target communication system using the base target policy;

wherein the first communication system is a cellular radio network, the first source policy dictates an action to be taken for the cellular radio network in a first state of a Markov decision process (MDP), and the first state corresponds to an N-tuple of observations; and     wherein the N-tuple of observations includes a plurality of cell physical resource block (PRB) ratio, $\rho_i$, a plurality of active number of terminals for an $i^{th}$ cell ($UE_i$), and a plurality of average data throughput per UE in the $i^{th}$ cell, $I_i$.

14. The non-transitory computer readable medium of claim 13, wherein each policy of the plurality of policies is associated with a different source domain.

15. The non-transitory computer readable medium of claim 13, wherein each policy of the plurality of policies is associated with a corresponding source domain of a plurality of source domains, and each source domain includes a task of idle mode load balancing (IMLB).

16. The non-transitory computer readable medium of claim 13, wherein the first reward is associated with a first source domain, the second reward is associated with a second source domain, and the instructions are further configured to cause the one or more processors to determine the plurality of rewards by:

accumulating the first reward as a first series of summands over a shallow testing length, wherein each summand of the first series is based on applying the first source policy to take a first action in transition from the first state of the MDP; and     accumulating the second reward as a second series of summands over the shallow testing length, wherein each summand of the second series is based on applying a second source policy to take a second action in transition from a second state of the MDP.

17. The non-transitory computer readable medium of claim 13, wherein the instructions are further configured to cause the one or more processors to build the replay buffer for the first communication system in the first state of the MDP by choosing the action by applying the selected policy to the first state, wherein the action corresponds to an adjustment of a reselection parameter for a cell in the first communication system.

\* \* \* \* \*